United States Patent

Sauer et al.

[15] 3,665,300
[45] May 23, 1972

[54] LIQUID LAYER THICKNESS DEVICE HAVING A FLOATING ELECTRODE

[72] Inventors: Walter Edwin Sauer, Pottstown; Vytautas Klemas, Berwyn, both of Pa.

[73] Assignee: General Electric Company

[22] Filed: Mar. 5, 1971

[21] Appl. No.: 121,285

[52] U.S. Cl. .......................................... 324/61 R, 317/246
[51] Int. Cl. ...................................................... G01n 27/26
[58] Field of Search .................... 324/61; 317/246; 73/304 C

[56] References Cited

UNITED STATES PATENTS 3,253,606  5/1966  Kuntz.................................324/61 X
3,452,275  5/1966  Haines et al. ...........................324/72

Primary Examiner—Edward E. Kubasiewicz
Attorney—Allen E. Amgott, William G. Becker, Henry W. Kaufmann, Frank L. Neuhauser, Oscar B. Waddell and Joseph B. Forman

[57] ABSTRACT

A device for measuring the thickness of a given immiscible liquid in a multi-liquid system wherein the other liquid or liquids in the system have a relatively higher dielectric constant than that of the given liquid. The device is comprised of a pair of substantially planar parallel electrodes which are mounted so that the upper electrode floats on the surface of the liquid system due to flotation means and the second electrode is positioned parallel thereto and at a level no higher than the lower-most level of the given liquid and means for measuring the capacitance between the pair of electrodes. The capacitance measured is therefore proportional to the thickness of the layer of the first liquid as the other liquids in the system are more highly conductive and therefore will not contribute significantly to the impedance (capacitance) measured.

8 Claims, 4 Drawing Figures

Patented May 23, 1972

INVENTORS:
VYTAUTAS KLEMAS,
WALTER E. SAUER,

BY William G. Becker
ATTORNEY

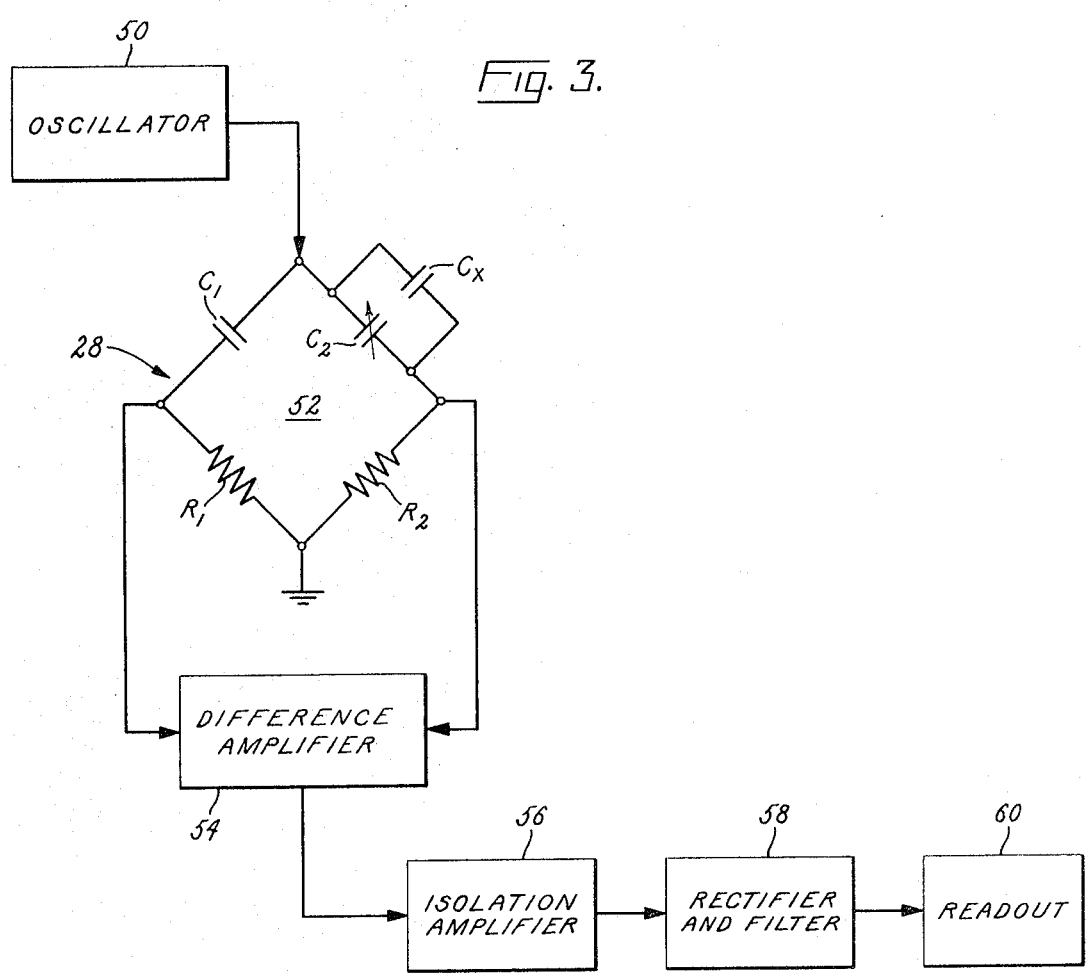

LIQUID LAYER THICKNESS DEVICE HAVING A FLOATING ELECTRODE

BACKGROUND OF THE INVENTION

The subject invention relates to liquid level measuring devices and, in particular, to a device for measuring the thickness of a layer of a particular liquid in a multi-liquid system.

It is frequently desirable or necessary to measure the thickness of a layer of one liquid in a liquid system including two or more immiscible liquids. Frequently, the liquid to be measured has a dielectric constant significantly lower than that of the other liquids in the system. An example of such a system is oil on water. Prior art optical techniques can measure the presence or absence of thin oil films on water but cannot determine the thickness of such a film. In addition, these techniques are subject to error due to the presence of other materials in the liquid system. It is well known that the level of one liquid in a multi-liquid system can be measured by use of a resistance device. Also, the level of a single liquid or solid can be measured by measuring the capacitance between one or more pairs of electrodes. One prior art capacitance probe device measures the level of water in a tank containing oil and water by noting the change in capacitance measured as a probe is lowered in the tank and passes through the oil/water interface. However, this device does not provide for continuous monitoring of the levels of the liquids. Also, length of cable unwound rather than the capacitance measurement indicates the level of the liquid.

SUMMARY OF THE INVENTION

An object of the subject invention is to provide a device for continuously measuring the thickness of a liquid layer in a multi-liquid system where the liquid to be measured has a significantly lower dielectric constant than the other liquids in the system.

In order to fulfill the above-mentioned object, the subject invention provides a device comprised of a pair of substantially planar, parallel electrodes, flotation means for causing one of the electrodes to float on the surface of the liquid system, support means for positioning the other electrode at or below the lower-most level of the liquid layer to be measured and means for measuring the capacitance of the liquid between the electrodes. The capacitance measured is proportional to the thickness of the liquid layer to be measured because the other liquids in the system have a much higher dielectric constant so that their effect on the capacitance measurement is negligible.

The subject matter which is regarded as the present invention is particularly pointed out and distinctly claimed in the concluding portion of this specification.

BRIEF DESCRIPTION OF THE DRAWINGS

The present invention, however, together with further objects and advantages thereof, may best be understood by reference to the following description taken in connection with the accompanying drawings in which:

FIG. 3 is a block diagram of one embodiment of capacitance measuring means for use in the subject invention; and FIG. 4 is a block diagram of another embodiment of capacitance measuring means which can be used in the subject invention.

DESCRIPTION OF THE PREFERRED EMBODIMENTS

Figure 1:
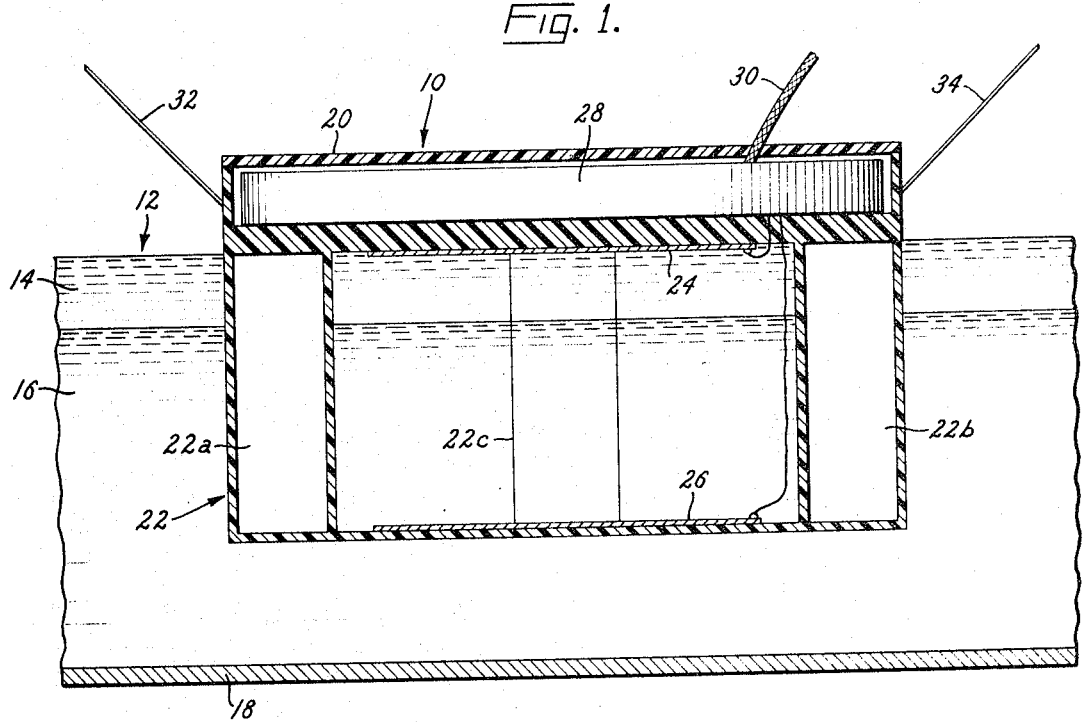
FIG. 1 is a side-sectional view of the preferred embodiment of the subject invention.

In FIG. 1 there is shown an embodiment of a liquid layer measuring device 10 in accordance with the subject invention. This embodiment is particularly designed for use in measuring a layer of liquid which is the top or one of the uppermost layers in a liquid system.

In FIG. 1 the liquid system 12, which includes two immiscible liquid layers 14 and 16, flows through an open channel, the bottom surface of the channel being denoted as 18. The first liquid layer 14 is the one to be measured and for example, may be oil. The second immiscible liquid has a significantly higher dielectric constant and, for example, may be water.

Device 10 includes a support structure 20, flotation means 22, a pair of generally planar metallic electrodes 24, 26 and means 28 for measuring the capacitance between electrodes 24 and 26.

Support means 20 is shown as a rigid plastic structure for supporting and housing, flotation means 22, electrodes 24, 26 and capacitance measuring means 28. Support means 20 may be of any desired shape, such as the cylindrical shape shown, and of any suitable non-conductive material such as plastic. Electrodes 24, 26 may be imbedded in the plastic to prevent corrosion.

Flotation means 22 is comprised of four equally spaced airtight chambers 22. Because this embodiment is shown in section in FIG. 1, only three of the chambers 22a, b, c, can be seen. Flotation chambers 22a, b, c cause the upper electrode 24 to rest on the surface of liquid system 12. Of course, the four chambers are positioned so as to allow the liquid to flow into the area between electrodes 24, 26. The quantity and configuration of the chambers may differ from that shown without hampering the operation of the measuring device. Any other suitable flotation means, such as a foam, may be used. For example, a suitable foam could be attached to support means 20 in place of chambers 22.

Lower electrode 26 is positioned so that it is at or below the lowermost level of the liquid layer 14 to be measured. Both electrodes 24, 26 are electrically connected to a suitable capacitance measuring means 28 such as the ones described hereinafter in regard to FIGS. 3 and 4. The output signal from such capacitance means 28 is connected to a read out device via cable 30. Also shown are mooring lines 32, 34 which maintain device 10 in a relatively stable position even if the liquid system is moving or is otherwise perturbed.

Figure 2:
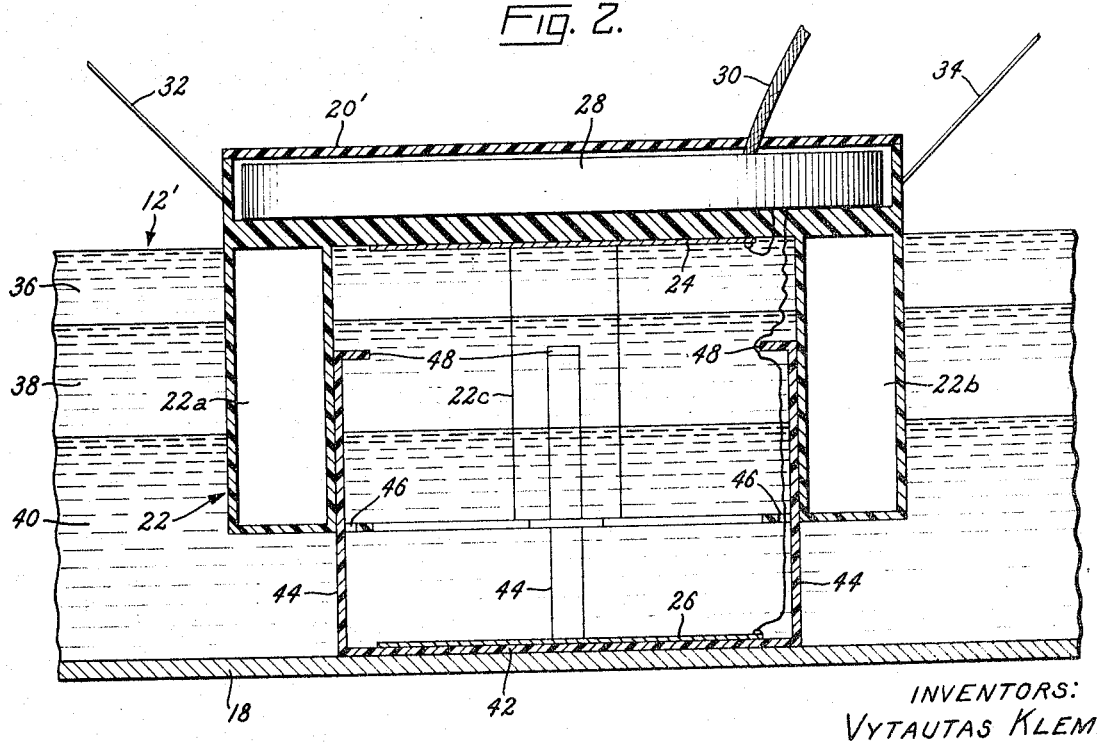
FIG. 2 is a side-sectional view of a second embodiment of the subject invention.

If the liquid layer to be measured is not one of the uppermost layers or if the layer to be measured extends close to the bottom of the container in which the liquid system is located, another embodiment, such as the one shown in FIG. 2, may be used in which like numbers correspond to like parts of FIG. 1. This embodiment differs from the one shown in FIG. 1 primarily in that the lower electrode 26 is not a fixed distance away from electrode 24; but rather provision is made to allow electrode 26 to descend to the extent provided by the configuration or contact the bottom of the channel.

The liquid system 12' shown in FIG. 2 is comprised of three immiscible liquid layers 36, 38, 40. Layer 38 is the one whose thickness is to be measured. The liquid in layer 38 has a relatively lower specific gravity than that of the liquid in layer 40, and the liquid in layer 36 has a relatively lower specific gravity than that of the liquid in layer 38. Support structure 20', flotation means 22, electrodes 24, 26 and capacitance measuring means 28 are essentially the same as that for the embodiment shown in FIG. 1. However, in this embodiment electrode 26 is attached to a support member 42 which includes a plurality (in this embodiment, four) vertically extending legs 44 which extend through slots 46 in support structure 20'. The uppermost extent of legs 44 includes stops 48 to prevent the legs from slipping out through the slots 46.

In operation, while flotation means 22 maintains electrode 24 on the surface of the liquid system 12', electrode 26, due to the weight of its support member 42 comes to rest at the bottom of the container or channel or at the lowermost extent provided by legs 44, whichever of these positions is lesser in depth. If necessary, additional weight may be added to support member 42 or one or more springs provided between support member 42 and a portion of support structure 20' to assure proper deployment of electrode 26.

As the liquids in layers 36, 40 have a significantly higher dielectric constant than the liquid in layer 38, their contribution to the total series impedance (capacitance) is relatively small and hence the capacitance measured between electrodes 24, 26 is proportional to the thickness of liquid layer 38.

One example of a capacitance measuring means 28 which may be employed in the subject invention is shown in FIG. 3. Capacitance measuring means 28 is comprised of an oscillator 50 which is electrically connected to a capacitance bridge 52, a difference amplifier 54 connected to opposite legs of the bridge 52, an isolation amplifier 56 for amplifying the output of difference amplifier 54 and a read out device 60 for providing a signal indicative of the thickness of the layer to be measured. The read out device could be a meter, pen recorder, etc. and could be calibrated in units of capacitance or directly in thickness. If desired, the read out device 60 could provide an audio or visual indication that the thickness of the layer is above a given maximum or below a given minimum.

Capacitance bridge 52 is comprised of four legs with a capacitor $C_1$ and $C_2$ on each of two of the legs and a resistor $R_1$ and $R_2$ on each of the other two legs. Electrodes 24, 26 of the floating capacitor are connected in parallel with variable capacitor $C_2$ for adjustment of the range and sensitivity. The oscillator is conducted across the junction of capacitors $C_1$ and $C_2$ and ground. The value of resistors $R_1$ and $R_2$ may be equal.

The operation of the capacitance bridge circuit shown in FIG. 3 is well known in the art. As the capacitance of $C_x$ increases the difference in voltage measured between the junctions of the capacitor and resistor legs will increase. This difference is measured and amplified, rectified and filtered so as to produce an output proportional to the capacitance of $C_x$ which is in turn proportional to the thickness of the liquid layer being measured.

Another example of a capacitance measuring means 28 which may be employed in the subject invention is shown in FIG. 4. This second embodiment of capacitance measuring means is comprised of an oscillator 62, a fixed capacitor $C_1$ connected to oscillator 62, an operational amplifier 64 in series with $C_1$ and in parallel with the floating capacitor $C_x$, an amplifier and rectifier 66 which amplifies and rectifies the voltage of the output of the above-mentioned circuitry and a read out device 68 such as a meter, which gives an indication of the output of amplifier and rectifier 66.

Due to the characteristics of an operational amplifier $V_{out} = (C_1/C_x)V$ in where $V_{out}$ is the voltage of the input signal to component 66 and $V$ in is the output voltage of oscillator 62. Therefore, as the capacitance between the electrodes of the floating capacitor $C_x$ is inversely proportional to the thickness of the layer to be measured, $V_{out}$ is directly proportional to the thickness of the layer.

It is desirable that the value of $C_1$ be within an order of magnitude of the range of values for $C_x$ and preferably within this range. When the thickness of oil is to be measured, this range might be about 5 – 100 picofarads.

Any edge effect nonlinearity of this proportionality can be experimentally determined and factored into the read out calibration. For example this may be accomplished by providing a nonlinear scale for a read out device such as a meter or by providing a nonlinear conversion table.

The liquid layer monitor of the subject invention has many advantages over devices commonly used for oil film monitoring which are primarily based on optical principles. Optical techniques can be used only to determine the presence or absence of thin oil films on water and are unreliable where other pollutants may be present on the liquid surface. The capacitance technique of the subject invention is unaffected by most other pollutants, continuous monitoring can be obtained for both static and dynamic flow conditions and the thickness as well as the presence or absence of the oil layer can be detected.

In one set of experiments it was found that oil layers could be monitored ranging in thickness from 0.1 inch to 2.0 inches. Of course, the range of thickness that can be detected depends on a number of factors including the characteristics of the liquids in the system, the flow conditions, the structural configuration, and the accuracy and sensitivity of the electrical components used.

While the subject invention is particularly useful for monitoring the thickness of a layer of oil on water, it may be used effectively for measuring the thickness of any liquid layer in a liquid system having two or more immiscible liquids where the liquid of the layer to be measured has a significantly lower dielectric constant than that of the other liquid or liquids.

It is obvious that modifications may be made to the subject invention which do not depart from the true scope and spirit thereof.

Therefore, it is intended that the subject invention be limited only by the appended claims.

What we desire and secure by letters patent of the United States is:

1. Apparatus for measuring the thickness of a layer of a given liquid in a liquid system comprised of two or more immiscible liquids wherein said given liquid has a dielectric constant significantly lower than that of the other liquid or liquids in the system, said apparatus being comprised of:
   a. a pair of substantially planar, parallel electrodes;
   b. means for supporting said electrodes in a generally parallel, opposed relationship with one of said electrodes being below the surface of said liquid system and at a level no higher than the lowermost level of said given liquid layer;
   c. flotation means for maintaining said other electrode on the surface of said liquid system; and
   d. means connected to said electrodes for measuring the capacitance between said parallel electrodes, said capacitance measurement being indicative of the thickness of said given liquid layer.

2. Apparatus as in claim 1 wherein said support means holds said one electrode a fixed distance from said other electrode.

3. Apparatus as in claim 1 further including means for mooring said support means to prevent movement of said electrodes in a moving liquid system.

4. Apparatus as in claim 1 wherein said flotation means includes at least one air-tight chamber.

5. Apparatus as in claim 1 wherein said measuring means includes a capacitance bridge.

6. Apparatus as in claim 1 wherein said measuring means includes an oscillator, a fixed capacitor and an operational amplifier in parallel with said electrodes and in series with said fixed capacitor.

7. Apparatus as in claim 1 wherein said support means includes means for varying the distance between said electrodes.

8. Apparatus as in claim 7 wherein said means for varying the distance between electrodes includes an extensible member for supporting said one electrode and means for limiting the extension of said member.

* * * * *